(No Model.)
J. KLEMM.
DEVICE FOR ATTACHING HANDLES TO IMPLEMENTS.
No. 510,271. Patented Dec. 5, 1893.
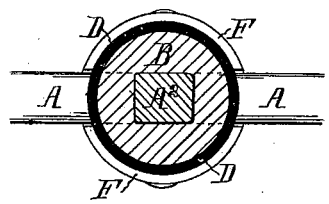
FIG. 3.
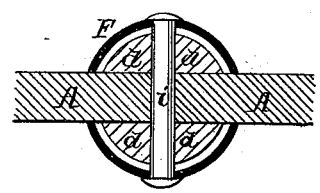
FIG. 4.
FIG. 1.
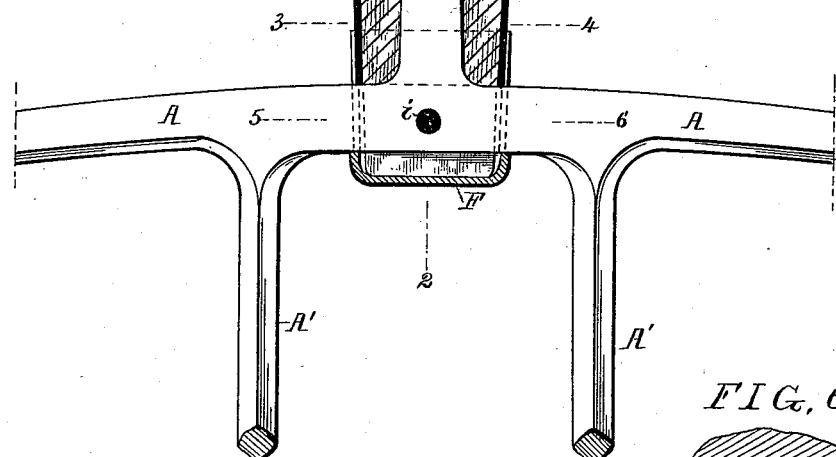
FIG. 5.
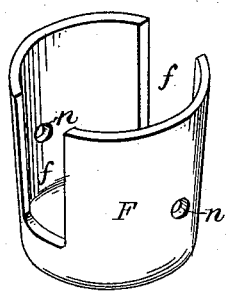
FIG. 2.
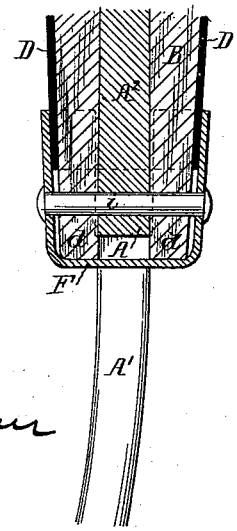
FIG. 6.
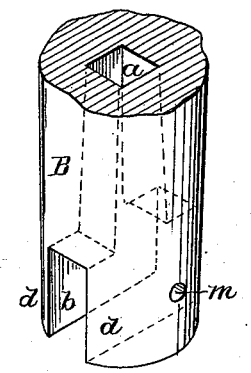
Witnesses:
Hamilton D. Turner
William N. Barr
Inventor
John Klemm
by his Attorneys
Howson & Howson

UNITED STATES PATENT OFFICE.

JOHN KLEMM, OF PHILADELPHIA, PENNSYLVANIA.

DEVICE FOR ATTACHING HANDLES TO IMPLEMENTS.

SPECIFICATION forming part of Letters Patent No. 510,271, dated December 5, 1893.

Application filed September 21, 1893. Serial No. 486,101. (No model.)

*To all whom it may concern:*

Be it known that I, JOHN KLEMM, a citizen of the United States, residing in Philadelphia, Pennsylvania, have invented certain Improvements in Devices for Attaching Handles to Implements, of which the following is a specification.

My invention relates to handles for pitch forks and like implements, the object of my invention being to so construct such a handle as to securely retain the fork, prevent loosening of the wooden handle and provide a neat finish at the point where the handle is connected to the cross bar of the fork. This object I attain in the manner hereinafter set forth, reference being had to the accompanying drawings, in which—

Figure 1, is a longitudinal section of part of a pitch fork handle constructed in accordance with my invention, part of the fork being shown in elevation. Fig. 2, is a transverse section on the line 1—2, Fig. 1. Fig. 3, is a sectional plan view on the line 3—4, Fig. 1. Fig. 4, is a sectional plan view on the line 5—6, Fig. 1. Fig. 5, is a perspective view of a cap forming part of the handle securing device; and Fig. 6, is a perspective view of the lower portion of the wooden handle.

A represents part of the back bar of a pitch fork or like tool, A' parts of two of the tines of the same, and $A^2$ the central tang or shank, all of these parts being constructed in the usual manner.

The wooden handle B of the tool has a central opening $a$ for the reception of the tang $A^2$ and has formed in its lower end a transverse slot $b$ for the reception of the back bar A of the fork, wings $d$ projecting down on each side of said back bar, as shown in Fig. 2.

The wooden handle is provided with a long ferrule D, the bottom of which has its bearing against the back of the bar A of the fork, as shown in Fig. 1. A cap F, having vertical slots $f$ in its opposite sides receives the bar A of the fork, the projecting wings $d$ of the wooden handle and the lower portion of the ferrule D, both the cap and the projecting wings of the wooden handle being secured to the bar A of the fork by means of a transverse pin or rivet $i$ which passes through an opening in said bar A, through openings $m$ in the wings $d$ and through openings $n$ in the cap, as shown in Fig. 2. The tang $A^2$ of the fork may also be secured to the wooden handle and its ferrule D by means of a transverse pin or rivet $s$ passing through the ferrule, handle and tang near the upper end of the latter in the usual manner.

By providing the wooden handle with projecting wings secured to the bar of the fork, a rigid connection is provided at the point where it is most desired, and by the use of the cap F these projecting portions of the wooden handle are protected, an outer metallic holder for the rivet is provided, and a neat finish for the inner end of the handle is insured, the construction, moreover, being of an extremely cheap and simple character.

Having thus described my invention, I claim and desire to secure by Letters Patent—

The combination of the fork or like tool with the wooden handle having projecting wings at its lower end flanking the back bar of the fork, the ferrule surrounding the lower portion of the handle, the end cap slotted for the reception of the back bar of the fork, and a transverse pin or rivet passing through the said cap, through the side wings of the wooden handle and through the back bar of the fork, substantially as specified.

In testimony whereof I have signed my name to this specification in the presence of two subscribing witnesses.

JOHN KLEMM.

Witnesses:
FRANK E. BECHTOLD,
WILLIAM A. BARR.